(12) United States Patent
Shannon et al.

(10) Patent No.: US 7,208,244 B2
(45) Date of Patent: Apr. 24, 2007

(54) DI-RUTHENIUM-SUBSTITUTED POLYOXOMETALATE ELECTROCATALYST AND METHOD OF OXYGEN GENERATION

(75) Inventors: Curtis G. Shannon, Auburn, AL (US); Annette R. Howells, Statesboro, GA (US)

(73) Assignee: Auburn University, Auburn, AL (US)

( * ) Notice: Subject to any disclaimer, the term of this patent is extended or adjusted under 35 U.S.C. 154(b) by 369 days.

(21) Appl. No.: 10/967,029

(22) Filed: Oct. 15, 2004

(65) Prior Publication Data

US 2005/0112055 A1 May 26, 2005

Related U.S. Application Data

(60) Provisional application No. 60/511,519, filed on Oct. 15, 2003.

(51) Int. Cl.
| | |
|---|---|
| *B01J 23/30* | (2006.01) |
| *C01G 41/02* | (2006.01) |
| *H01M 4/48* | (2006.01) |
| *C01B 13/02* | (2006.01) |
| *C25B 1/02* | (2006.01) |
| *C25B 1/04* | (2006.01) |

(52) U.S. Cl. .................. 429/40; 205/464; 423/579; 423/594.13; 429/229; 502/307

(58) Field of Classification Search ........... 423/594.13, 423/579; 502/307; 429/40, 229; 205/464
See application file for complete search history.

(56) References Cited

U.S. PATENT DOCUMENTS 4,039,409 A * 8/1977 LaConti et al. .............. 205/631

OTHER PUBLICATIONS

Ronny Neumann et al, "Hydroxylation of Alkanes with Molecular Oxygen Catalyzed by a New Ruthenium-Substituted Polyoxometalate, [WZnRu$_2^{III}$(OH)(H$_2$O)(ZnW$_9$O$_{34}$)$_2$]"—,Angew. Chem. Int. Ed. Engl. 1995, 34, No. 15, 1587-1589, no month.*
Bockris, J. O'M; Otagawa, T., "Mechanism of Oxygen Evolution on Perovskites", J. Phys. Chem. 1983, 87, 2960-2971, no month.
Gersten, S.W.; Samuels, G.J.; Meyer, T.J., "Catalytic Oxidation of Water by an Oxo-Bridged Ruthenium Dirner," J. Am. Chem. Soc. 1982, 104, 4029-4030, no month.
Neumann, R.; Khenkin, A. M., "Noble Metal (Ru III, Pd II, Pt II) Substituted "Sandwich" Type Polyoxometalates: Preparation, Characterization, and Catalytic Activity in Oxidations of Alkanes and Alkenes by Peroxides", Inorg. Chem. 1995, 34, 5753-5760, no month.
Rong, C; Pope, M. T., "Lacunary Polyoxometalate Anions Are Pi-Acceptor Ligands. Characterization of Some Tungstoruthenate (II, III, IV, V) Heteropolyanions and Their Atom-Transfer Reactivity," J. Am. Chem. Soc. 1992, 114, 2932-2938, no month.
Rüttinger, W.; Dismukes, G.C., "Synthetic Water-Oxidation Catalysts for Artificial Photosynthetic Water Oxidation," Chem. Rev. 1997, vol. 97, No. 1, 1-24, no month.

* cited by examiner

*Primary Examiner*—Wayne A. Langel
(74) *Attorney, Agent, or Firm*—Haverstock & Owens LLP (57) ABSTRACT

A catalyst comprising a di-ruthenium-substituted polyoxometalate, especially Na$_{14}$[Ru$_2$Zn$_2$(H$_2$O)$_2$(ZnW$_9$O$_{34}$)$_2$] with a Ru—Ru distance of 0.318 nm and a method of using the electrocatalyst to generate oxygen.

5 Claims, 7 Drawing Sheets

DI-RUTHENIUM-SUBSTITUTED POLYOXOMETALATE ELECTROCATALYST AND METHOD OF OXYGEN GENERATION

CROSS REFERENCE TO RELATED APPLICATIONS

This application claims priority to U.S. Provisional Application Ser. No. 60/511,519, filed Oct. 15, 2003, which is hereby incorporated by reference in its entirety for all of its teachings.

BACKGROUND

Developing catalysts for the oxidation of water to dioxygen is important in understanding the molecular-level details of photosynthesis and also in designing alternative energy sources such as regenerative fuel cells. Owing to the thermodynamic and mechanistic constraints of the reaction and the additional requirement that the catalytic site be contained in a coordination environment that is stable under oxidizing conditions, it is perhaps not surprising that there are relatively few well-characterized water oxidation catalysts.

The majority of non-biological water oxidation catalysts are related to the μ-oxy bonded di-ruthenium system first studied by Meyer et al. Gersten, S. W.; Samuels, G. J.; Meyer, T. J., *J. Am. Chem. Soc.* 1982, 104, 4029. Other synthetic water oxidation catalysts are known and have been reviewed by Dismukes et al. Rüttinger, W.; Dismukes, G. C. *Chem. Rev.* 1997, 97, 1.

Water oxidation can be carried out, for example, photocatalytically and electrocatalytically. The study of electrocatalytic water oxidation has focused on metal oxide systems, including $RuO_2$ and $IrO_2$.

A need still exists for water oxidation catalysts.

SUMMARY OF THE INVENTION

The present invention provides novel di-ruthenium substituted polyoxometallate catalysts for the efficient electrochemical generation of oxygen, specifically $Na_{14}[Ru_2Zn_2(H_2O)_2(ZnW_9O_{34})_2]$ with a Ru—Ru distance of 0.318 nm. The exclusively inorganic nature of the catalyst makes it stable under strongly oxidizing conditions, which is in contrast to catalysts based on organometallic compounds.

Also provided is a method for electrochemical generation of oxygen, specifically by water oxidation, comprising providing a di-ruthenium substituted polyoxometallate catalyst, specifically $Na_{12}[Ru_2Zn_2(H_2O)_2(ZnW_9O_{34})_2]$ with a Ru—Ru distance of 0.318 nm. The method can comprise adding the catalyst to an electrolyte and applying a potential.

The advantages of the present system include chemical stability of the catalyst, the ability to substitute different transition metals into the active site of the catalyst, the simplicity of preparation of the catalyst, and the ability to apply the catalyst to surfaces in a straightforward fashion.

This system is particularly suitable for use in commercial oxygen generators and regenerative fuel cells, for example.

Aspects of the invention include

1) The chemical composition $Na_{14}[Ru_2Zn_2(H_2O)_2(ZnW_9O_{34})_2]$, with a Ru—Ru distance of 0.318 nm, prepared by synthesis from the corresponding un-substituted Zn-containing POM precursor, $Na_{12}[WZnZn_2(H_2O)_2(ZnW_9O_{34})_2]$, using the procedure previously published by Neumann and co-workers (Neumann, R.; Khenkin, A. M. *Inorg. Chem.* 1995, 34, 5753). X-Ray diffraction measurements demonstrate that the resulting di-Ru-substituted POM corresponds to $Na_{12}[Ru_2Zn_2(H_2O)_2(ZnW_9O_{34})_2]$ with a Ru—Ru distance of 0.318 nm.

2) A method for the electrochemical generation of oxygen comprising providing di-Ruthenium-substituted polyoxometalate electrocatalysts. These di-Ruthenium-substituted polyoxometalate catalysts are obtainable by synthesis from their corresponding un-substituted Zn-POM precursors.

3) A method for the electrochemical generation of oxygen comprising providing the catalyst composition $Na_{14}[Ru_2Zn_2(H_2O)_2(ZnW_9O_{34})_2]$, with a Ru—Ru distance of 0.318 nm.

4) An electrochemical catalyst composition comprising adsorbed layers of a di-Ru-substituted polyoxometalate.

5) An electrochemical catalyst composition comprising adsorbed layers of di-Ru-substituted POM $\{[WZnRu_2(OH)(H_2O)](ZnW_9O_{34})_2\}^{14-}$.

6) An electrochemical catalyst assembly comprising the catalyst composition $Na_{14}[Ru_2Zn_2(H_2O)_2(ZnW_9O_{34})_2]$.

Additional advantages will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below. Like numbers represent the same elements throughout the figures.

DETAILED DESCRIPTION

Before the present compounds, compositions, articles, devices, and/or methods are disclosed and described, it is to be understood that the aspects described below are not limited to specific synthetic methods, specific methods as such may, of course, vary. It is also to be understood that the terminology used herein is for the purpose of describing particular aspects only and is not intended to be limiting.

In this specification and in the claims which follow, reference will be made to a number of terms which shall be defined to have the following meanings:

It must be noted that, as used in the specification and the appended claims, the singular forms "a," "an," and "the" include plural referents unless the context clearly dictates otherwise. Thus, for example, reference to "an electrolyte" includes more than one electrolyte, reference to "a polyoxometalate" includes mixtures of two or more such polyoxometalates, and the like.

"Optional" or "optionally" means that the subsequently described event or circumstance can or cannot occur, and that the description includes instances where the event or circumstance occurs and instances where it does not.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Polyoxometalates (POMs) are highly symmetric, stable, nanometer scale clusters which resemble discrete fragments of bulk metal oxide phases with characteristic sizes and shapes. They generally contain early transition metal ions coordinated to oxygen in an octahedral environment. POMs adsorbed on metal substrates are good models of metal oxide surfaces. One of the most attractive features of polyoxometalates (POMs) as catalysts is that the wholly inorganic coordination environment makes them inherently stable to oxidative decomposition.

Several years ago, Neumann, et al. (Neumann, R.; Khenkin, A. M. *Inorg. Chem.* 1995, 34, 5753) synthesized a Ru-substituted POM catalyst, $\{[WZnRu_2(OH)(H_2O)](ZnW_9O_{34})_2\}^{11-}$, that can be succinctly described as consisting of a central "belt" of four transition metals ($WZnRu_2$) capped at both axial positions by a polyoxometalate framework. The Ru—Ru interatomic distance was measured to be about 0.5 nm. This class of transition-metal-substituted POMs has been shown to catalyze a variety of organic oxidations in diverse media, but these compounds have not previously been used as water oxidation catalysts.

A di-Ru-substituted POM of the invention was synthesized from the corresponding un-substituted Zn-containing POM precursor, $Na_{12}[WZnZn_2(H_2O)_2(ZnW_9O_{34})_2]$, using the procedure previously published by Neumann and co-workers (Neumann, et al. 1995). X-Ray diffraction measurements demonstrated that the resulting di-Ru-substituted POM corresponds to $Na_{14}[Ru_2Zn_2(H_2O)_2(ZnW_9O_{34})_2]$ with a Ru—Ru distance of 0.318 nm. Neumann and co-workers reported a different structure for the composition they produced, assigned as $Na_{12}[WZnRu_2(H_2O)_2(ZnW_9O_{34})_2]$ with a Ru—Ru interatomic distance of about 0.5 nm.

The di-Ru-substituted POM $[Ru_2Zn_2(H_2O)_2(ZnW_9O_{34})_2]^{14-}$ was demonstrated to be an effective catalyst for the electrochemical generation of oxygen. It shares many of the positive features of other stable water oxidation catalysts. Adsorbed layers of this compound are expected to provide an excellent model for metal oxide-based electrode materials.

Preferred embodiments of the present invention include

1) The chemical composition $Na_{14}[Ru_2Zn_2(H_2O)_2(ZnW_9O_{34})_2]$ with a Ru—Ru distance of 0.318 nm, prepared by synthesis from the corresponding un-substituted Zn-containing POM precursor, $Na_{12}[WZnZn_2(H_2O)_2(ZnW_9O_{34})_2]$, using the procedure previously published by Neumann and co-workers. X-Ray diffraction measurements demonstrated that the resulting di-Ru-substituted POM corresponds to $Na_{14}[Ru_2Zn_2(H_2O)_2(ZnW_9O_{34})_2]$ with a Ru—Ru distance of 0.318 nm.

2) A method for the electrochemical generation of oxygen comprising providing di-ruthenium-substituted polyoxometalate electrocatalysts which are obtainable by synthesis from the corresponding un-substituted Zn-POM precursors.

3) A method for the electrochemical generation of oxygen comprising providing the catalyst composition $Na_{14}[Ru_2Zn_2(H_2O)_2(ZnW_9O_{34})_2]$ with a Ru—Ru distance of 0.318 nm.

4) An electrochemical catalyst composition comprising adsorbed layers of di-Ru-substituted polyoxometalates.

5) An electrochemical catalyst composition comprising adsorbed layers of di-Ru-substituted POM $[Ru_2Zn_2(H_2O)_2(ZnW_9O_{34})_2]^{14-}$.

6) An electrochemical catalyst assembly comprising the catalyst composition of the invention.

A. Compositions

One aspect of the invention, described herein, includes di-ruthenium-substituted polyoxometalate electrocatalysts.

Figure 1:
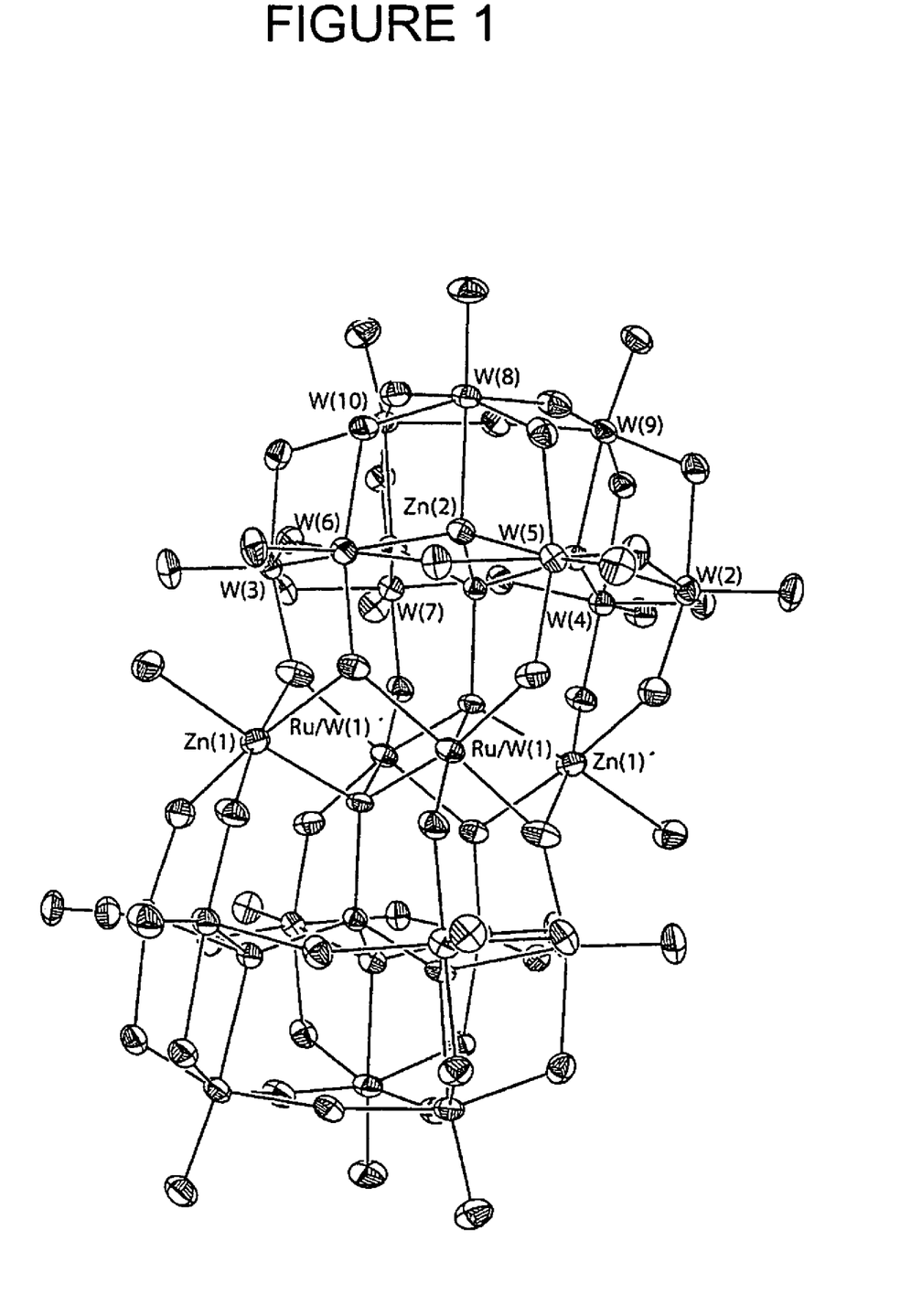
FIG. 1 shows the X-ray crystal structure (ORTEP plot) of the di-Ru POM, $[Ru_2Zn_2(H_2O)_2(ZnW_9O_{34})_2]^{14-}$. The ellipsoids are at 40% probability.

In a more specific aspect the invention includes the composition having the formula $Na_{14}[Ru_2Zn_2(H_2O)_2(ZnW_9O_{34})_2]$ with a Ru—Ru distance of 0.318 nm. See FIG. 1 for the X-ray crystal structure of $[Ru_2Zn_2(H_2O)_2(ZnW_9O_{34})_2]^{14-}$. The composition was made using the method described below. X-ray diffraction measurements and elemental analysis showed the $Na_{14}[Ru_2Zn_2(H_2O)_2(ZnW_9O_{34})_2]$ structure and the Ru—Ru distance.

B. Synthetic Methods

A di-Ru-substituted POM of the invention was synthesized from the corresponding un-substituted Zn-POM precursor using the procedure previously published by Neumann and co-workers, supra. Specifically, $Na_{12}[WZnZn_2(H_2O)_2(ZnW_9O_{34})_2]+Ru(dmso)_2Cl_4 \rightarrow Na_{12}[Ru_2Zn_2(H_2O)_2(ZnW_9O_{34})_2]$ Other methods of synthesizing (or variations thereof) the catalysts of the present invention are within the skill of one of ordinary skill in the art.

C. Utility

The compositions of the present application are useful as catalysts, for example, the compositions can be used to catalyze the electrochemical generation of oxygen.

Though not wishing to be bound by any mechanisms, it is believed that the proximity of the two ruthenium atoms in the present composition appears to be a key factor in the electocatalyst's ability to generate $O_2$.

A method of the invention comprises providing a composition of the invention, e.g., $Na_{14}[Ru_2Zn_2(H_2O)_2(ZnW_9O_{34})_2]$ to a reaction medium containing oxygen under conditions effective to catalyze the generation of dioxygen. For example, the method can comprise adding the catalyst composition to an electrolyte, providing electrodes, and providing a potential to the system effective to generate oxygen, $O_2$. In a preferred embodiment, the electrolyte solution is aqueous, the electrodes include an Au anode, and the potential is about 0.74V at a pH of about 7 to about 8.

The catalysts can also be used in various apparatuses, for example, those utilizing electrochemical generation of oxygen. Specific examples include oxygen generators and regenerative fuel cells.

EXAMPLES

The following examples are put forth so as to provide those of ordinary skill in the art with a complete disclosure and description of how the compounds, compositions, articles, devices, and/or methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example 1

Generation of Oxygen

The electrochemical generation of oxygen was studied using pulsed voltammetry.

Experimental Conditions:

In the first set of experiments, the amount of oxygen produced was measured using a Clark oxygen sensor fabricated with a 25 μm diameter Pt disk as the working electrode.

A three-point calibration of the Clark electrode was carried out using $N_2$-saturated, air-saturated, and $O_2$-saturated solutions as standards. These solutions gave a sensor response of 0, –1.5, and –5.3 nA, respectively. To relate this calibration data to a known electrochemical response, oxygen evolution from the naked Au anode (2 cm² surface area) was measured using the same sensor. When a potential pulse (2 sec) of 2.0V was applied to the Au anode, a sensor response of –2.1 nA was measured. At potentials of 1.5 V and 1.0 V, the sensor response was –0.73 nA and –0.36 nA, respectively.

The sensor assembly was separated from the test solution with an oxygen-permeable Teflon® membrane and held in close physical proximity to a polycrystalline Au anode that served as the working electrode (the Clark sensor and Au anode served as dual working electrodes) in a conventional three-electrode electrochemical cell in which a Pt wire was the counter electrode and an Ag wire served as a quasi-reference electrode (QRE).

The potentials of the Clark sensor and the Au anode were controlled using a conventional bipotentiostat. The potential of the Ag QRE was calibrated using a normal hydrogen electrode (NHE), and all potentials were referenced to the $H^+/H_2$ couple. The supporting electrolyte was a pH 8 phosphate buffer in which the total analytical concentration of phosphate was 0.10 M.

Oxygen generation experiments were performed in solutions that had been purged with ultrahigh purity $N_2$ for 30 min. and that were maintained under a $N_2$ atmosphere during all measurements.

The Au anode was stepped from a rest potential of +0.3 V (vs. NHE) to a series of increasingly positive potentials. The duration of each voltage pulse was 2 sec.; after each pulse, the potential was stepped back to +0.3 V to re-establish the baseline.

A second run was also performed with slightly different experimental conditions:
Clark sensor had a 500 μm diameter Pt disk
Au anode was stepped from a rest potential of +0.2 V (vs $H^+/H_2$) to a series of increasingly positive potentials
duration of each voltage pulse was 5 sec.; after each pulse, the potential was stepped back to +0.2 V to re-establish the baseline Results:

The amperometric response of the Clark electrode was measured continuously as the Au anode was subjected to the first potential program and was plotted as a function of time. Representative data are presented in FIG. 2.

Figure 3:
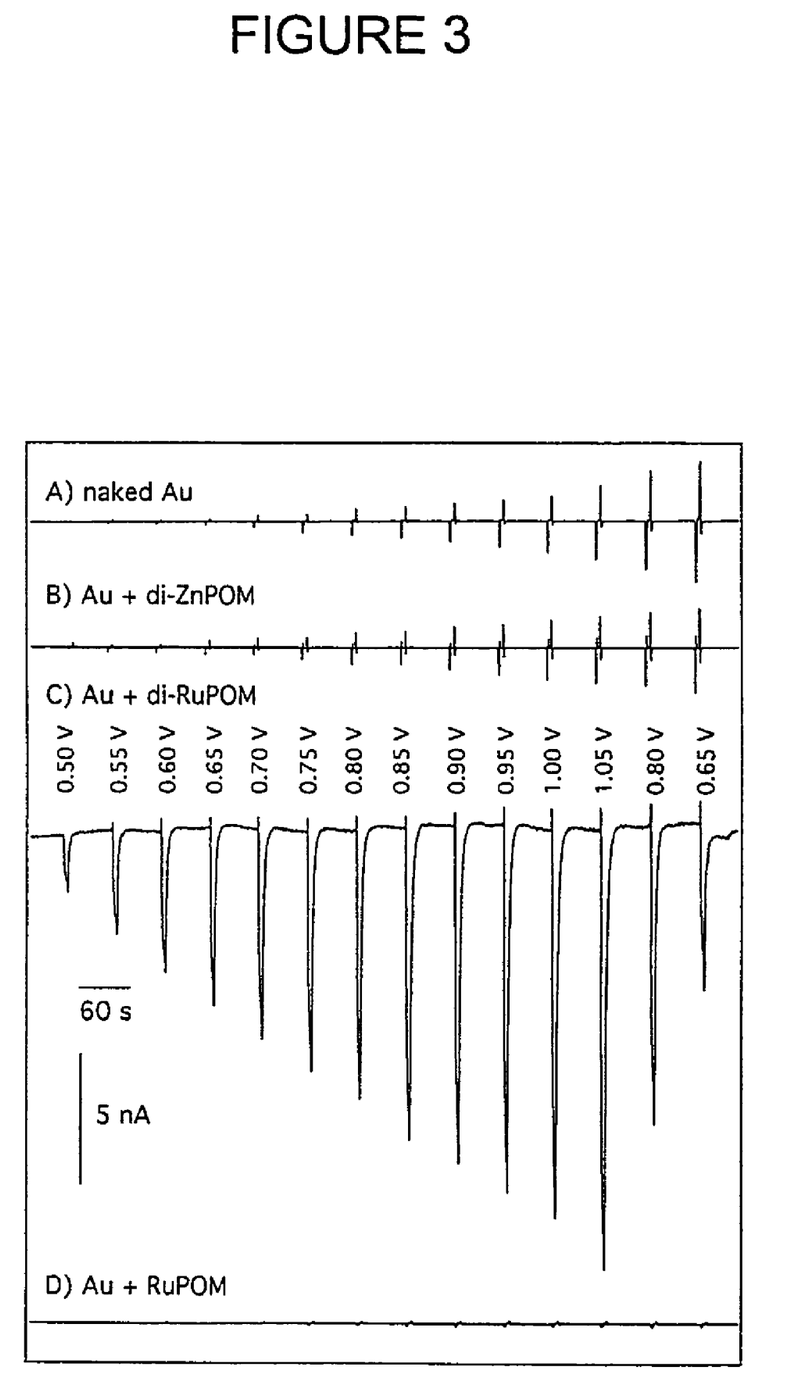
FIG. 3 shows representative data of electrochemical generation of oxygen using pulsed voltammetry from the second run of Example 1. A=Au anode alone; B=Au+un-substituted Zn-POM (2 μM concentration); C=Au+di-Ru-substituted POM (2 μM concentration); D=Au+mono-Ru POM (2 μM). Traces are offset for clarity of presentation.

The amperometric response of the Clark electrode for the second run is shown in FIG. 3.

Figure 2:
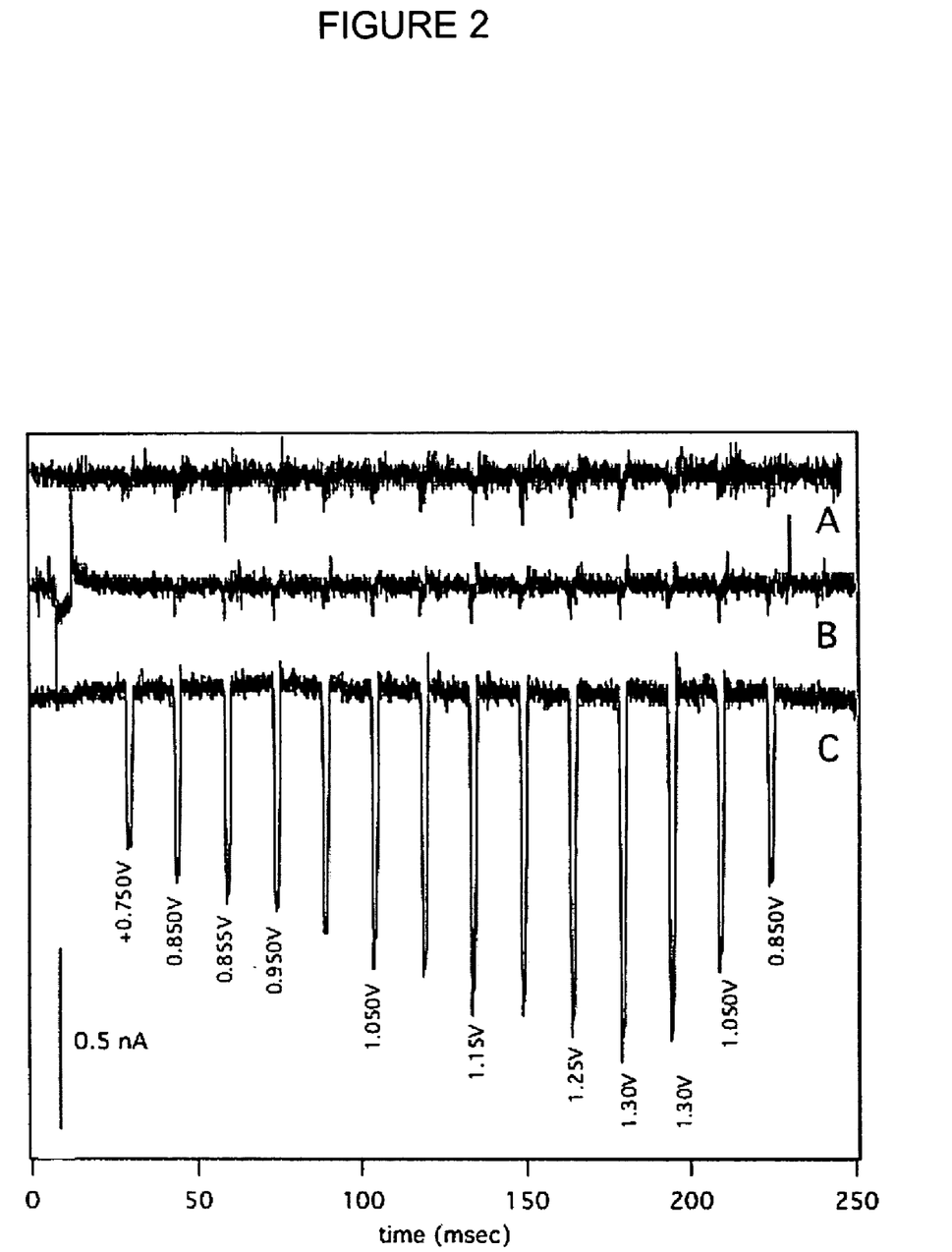
FIG. 2 shows representative data of electrochemical generation of oxygen using pulsed voltammetry from the first run of Example 1. A=Au anode alone; B=un-substituted Zn-POM (2 μM concentration); C=di-Ru-substituted POM (2 μM concentration). Traces are offset for clarity of presentation.

The baseline level of the Clark sensor was approximately the same in all runs; the traces have been offset for clarity of presentation.

Trace A shows the response of the Au anode alone (no catalyst) to a series of voltage pulses in pH 8 phosphate electrolyte. No measurable oxygen generation is observed from the Au electrode until a potential of nearly +1.4 V (+1.05 V in second run) is applied, consistent with the known oxygen generation behavior of Au electrodes (see e.g., Conway, B. E. *Prog. Surf. Sci* 1995 49, 331). The small (i.e., pA) current spikes that are observed in this data set are due to capacitive charging effects that occur when the potential of the working electrode is stepped and are non-faradaic in nature.

Trace B shows the response of the system to an identical potential program after the addition of the un-substituted di-Zn-POM (spiking with an aliquot of a stock solution of the un-substituted Zn-POM and the electrolyte) to the electrochemical cell. The analytical concentration of Zn-POM was 2 μM. The behavior of this system was identical to the behavior of the Au anode alone, indicating that the as-prepared Zn-POM is not catalytically active for oxygen generation. Decomposition of the POM to form small amounts of oxygen was not observed to take place to any measurable extent.

Trace C shows the response of the Clark sensor after the addition of di-Ru-substituted POM (addition of solution of di-Ru-substituted POM and electrolyte) to pure electrolyte (2 μM final concentration). Electrochemically driven generation of oxygen by this system was clearly observed as negative-going current spikes in phase with the applied potential pulses. The amperometric response of the Clark sensor corresponds to the reduction of dioxygen; therefore, negative-going currents correspond to the generation of oxygen, and positive-going currents correspond to a decrease in the amount of oxygen at the sensor.

From these data, it is clear that oxygen generation was only observed when the working electrode potential is stepped positively from the rest potential; when the potential was stepped back to +0.3 V (+0.2V), the response of the oxygen sensor (Clark sensor) returned rapidly to its baseline value.

Trace D of the second run (FIG. 3) shows the response of the Clark sensor in a solution containing a mono-substituted RuPOM catalyst, $[PW_{11}O_{39}Ru(H_2O)]^{4-}$, a compound first synthesized by Pope et al. that exhibits a Keggin-type structure (Rong, C.; Pope, M. T. *J. Am. Chem. Soc.* 1992 114, 2932). No catalytic activity for oxygen generation was observed for this compound.

Example 2

Characterization of the System

The reproducibility of the Clark sensor was found to be a sensitive function of its placement with respect to the Au anode. To overcome this limitation, further characterization of this system was carried out using a rotating ring disk electrode assembly.

Oxygen generated at the Au disk anode was collected at a Pt ring. Mass transport from the disk to the ring was controlled by appropriate choice of the electrode rotation rate. The disk response consists of an initial rapid response (i.e., anodic) increase in current, followed by a slower, quasi-Cottrell (i.e., $i \propto t^{-1/2}$) decrease (see inset of FIG. 5). The current-time response was similar to that of a stationary electrode because the voltage pulses were kept shorter than the time required to establish a steady-state current in order to prevent the accumulation of excess oxygen. When the potential was stepped back to its base value, a negative-going current was observed due to reduction of oxygen in the double layer.

In these experiments, which are conceptually similar to those described in Example 1, the Pt ring was maintained at a constant potential of −0.7 V while the potential of the Au disk was pulsed to increasingly positive voltages in run 1 (−0.20V in run 2 (pulse duration, 5 s)). The current at the Pt disk was measured at a rotation rate of 3000 rpm for run 1, which was determined empirically to be optimum. The rotation rate for run 2 was 1600 rpm.

Figure 4A:
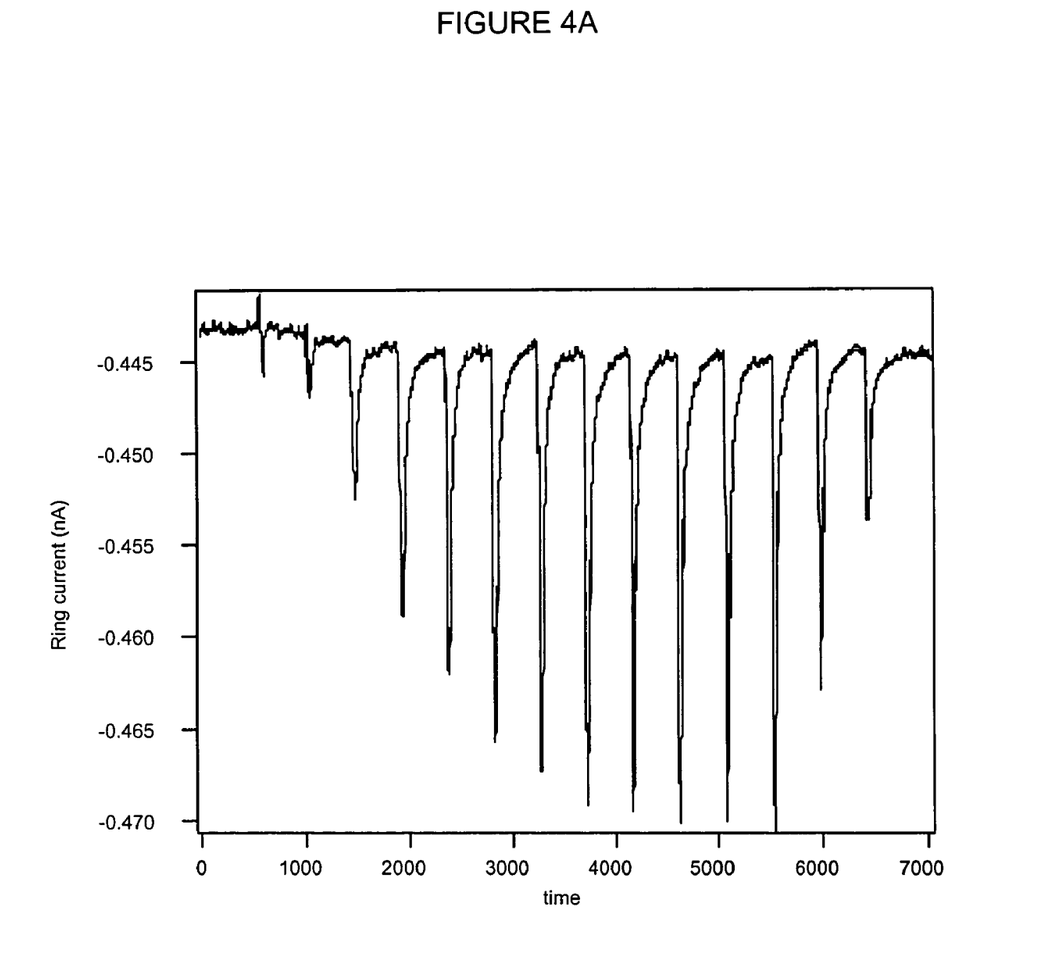
FIG. 4A shows run 1 representative data of electrochemical generation of oxygen using pulsed voltammetry with a rotating ring disk electrode assembly from Example 2.
Figure 4B:
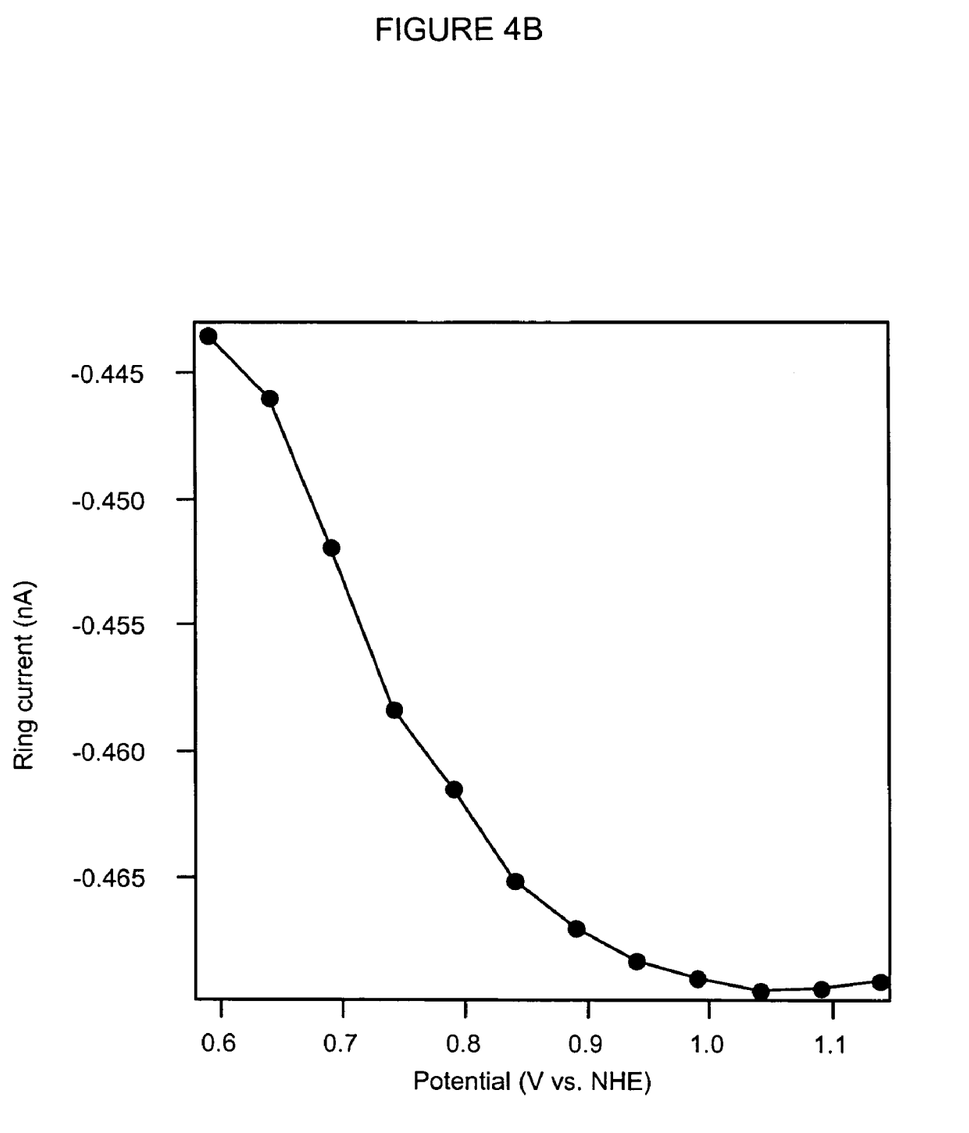
FIG. 4B shows run 1 polarization curves for oxygen generation from Example 2.

Representative data for run 1 are plotted in FIG. 4A for measurements carried out at pH 8. Polarization curves for oxygen generation for run 1 were constructed by plotting the maximum ring current observed during the pulse as a function of the disk potential and are shown in FIG. 4B. The observed $E_{1/2}$ for oxygen generation appeared to be consistent with the thermodynamics of water oxidation ($E°=+0.760$ V vs. NHE at pH 8).

Figure 5:
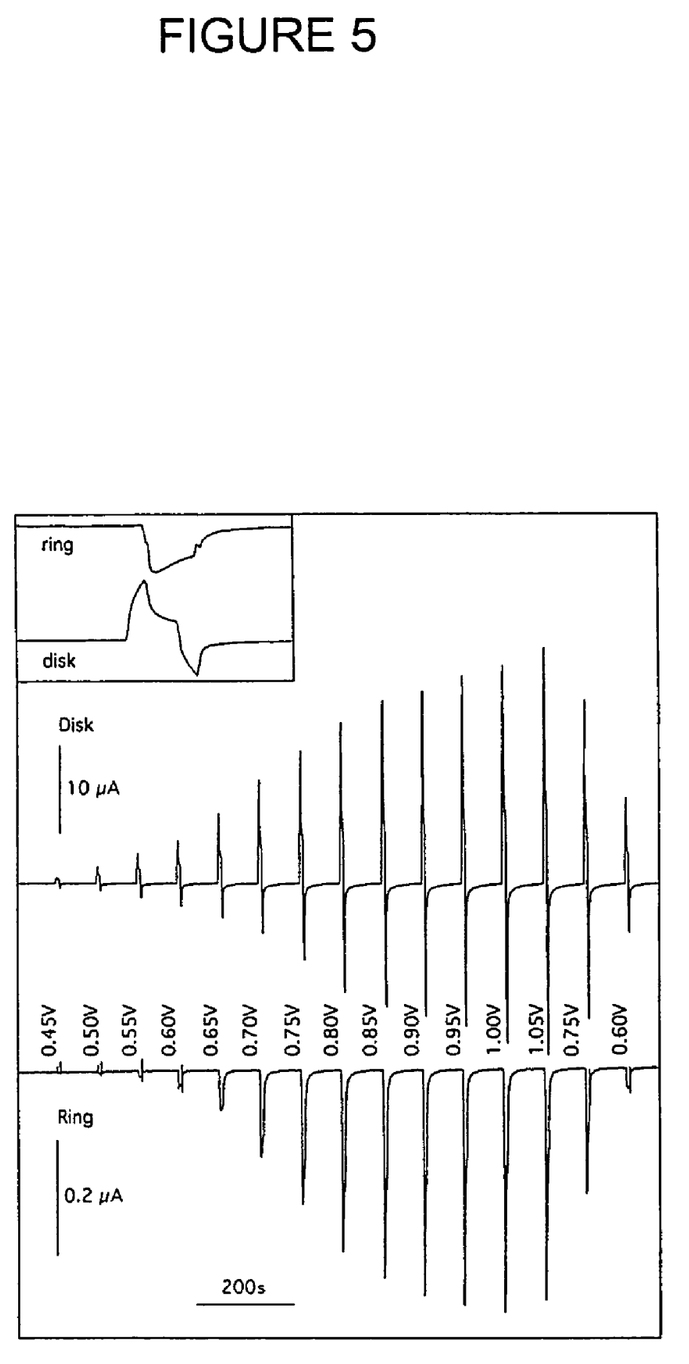
FIG. 5 shows run 2 results for the ring and disk responses from Example 2.

FIG. 5 shows the results of run 2. The response of the Pt ring to the voltage program is shown in the lower trace; the pulse shapes are qualitatively similar to those seen for the disk. A small but noticeable dip in the ring response occurs at the same time point that the cathodic disk current reaches its maximum value and is due to the disk shielding the ring. An approximate $E_{1/2}$ for the electrocatalytic generation of oxygen of +0.750 V was calculated from the disk i-E data and is consistent with the thermodynamics of oxygen generation and with the redox properties of the di-Ru POM electrocatalyst.

Example 3

Redox Properties of the POM

Figure 6:
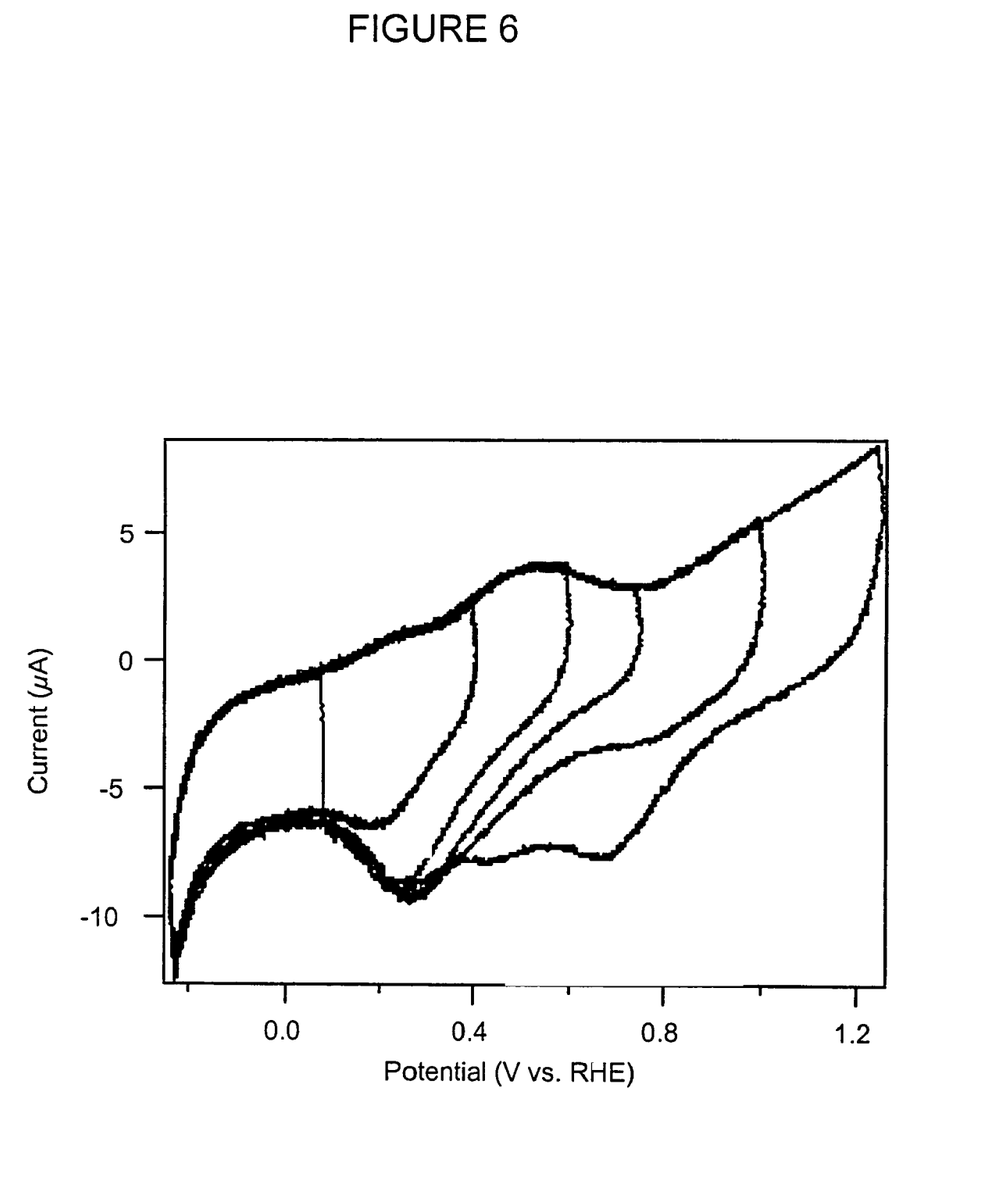
FIG. 6 shows the voltammetric behavior of the di-Ru-substituted POM from Example 3.

The redox properties of the POM itself must be consistent with the observed $E_{1/2}$ for oxygen generation; therefore, we measured the voltammetric behavior of the di-Ru-substituted POM itself, FIG. 6.

Tentative assignment of these voltammetric features were made by comparing them to the previously reported study of Pope et al. (Rong, C.; Pope, M. T. *J. Am. Chem. Soc.* 1992, 114, 2932), who measured the voltammetric behavior of the related Ru-POM, $[PW_{11}O_{39}Ru^{III}(H_2O)]^{4-}$. The $E_{1/2}$ values of the $Ru^{II/III}$, $Ru^{III/IV}$ and $Ru^{IV/V}$ couples were found to be −0.10, +0.20, and +0.85 V, respectively, at pH 7. These values are in qualitative agreement with our findings.

Cyclic voltammetry shows three waves at ca. −0.15, +0.28, and +0.76 V for the compound, which was tentatively assigned as corresponding to $Ru^{II/III}$, $Ru^{III/IV}$ and $Ru^{IV/V}$ couples.

The disk current was sampled at a constant delay time after each voltage pulse and a Tafel analysis (i.e., a plot of ln i vs. E) was performed. A Tafel slope of ca. 120 mV was found, about twice the value typically observed for RuO2, but typical of values measured for perovskite anodes (Bockris, J. O'M.; Otagawa, T. *J. Phys. Chem.* 1983, 87, 2960).

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed is:

1. A composition comprising $Na_{14}[Ru_2Zn_2(H_2O)_2(ZnW_9O_{34})_2]$ with a Ru—Ru distance of 0.318 nm.

2. The composition of claim 1 wherein the composition is prepared from a corresponding un-substituted Zn-containing POM precursor, $Na_{12}[WZnZn_2(H_2O)_2(ZnW_9O_{34})_2]$.

3. A composition prepared by the method comprising refluxing $Na_{12}[WZnZn_2(H_2O)_2(ZnW_9O_{34})_2]$ with Ru at 90° C. for 12 hr.

4. A catalyst comprising $Na_{14}[Ru_2Zn_2(H_2O)_2(ZnW_9O_{34})_2]$ with a Ru—Ru distance of 0.318 nm.

5. An electrochemical catalyst assembly comprising the composition of claim 1.

* * * * *